United States Patent
Reisacher

(10) Patent No.: US 11,731,215 B2
(45) Date of Patent: Aug. 22, 2023

(54) MACHINE TOOL FOR BUILD-UP WELDING

(71) Applicant: SAUER GmbH, Stipshausen (DE)

(72) Inventor: Martin Reisacher, Kempten (DE)

(73) Assignee: SAUER GmbH, Stipshausen (DE)

( * ) Notice: Subject to any disclaimer, the term of this patent is extended or adjusted under 35 U.S.C. 154(b) by 363 days.

(21) Appl. No.: 16/305,739

(22) PCT Filed: Jun. 7, 2017

(86) PCT No.: PCT/EP2017/063817
§ 371 (c)(1),
(2) Date: Nov. 29, 2018

(87) PCT Pub. No.: WO2017/211882
PCT Pub. Date: Dec. 14, 2017

(65) Prior Publication Data
US 2020/0316716 A1 Oct. 8, 2020

(30) Foreign Application Priority Data
Jun. 7, 2016 (DE) ...................... 10 2016 210 042.4

(51) Int. Cl.
*B23K 26/342* (2014.01)
*B33Y 10/00* (2015.01)
(Continued)

(52) U.S. Cl.
CPC ........ *B23K 26/342* (2015.10); *B23K 26/0093* (2013.01); *B23K 26/0884* (2013.01);
(Continued)

(58) Field of Classification Search
CPC ............... B23K 26/342; B23K 26/144; B23K 26/0093; B23K 26/0884; B23K 26/127;
(Continued)

(56) References Cited

U.S. PATENT DOCUMENTS 6,326,585 B1 * 12/2001 Aleshin ................... F01D 5/005
219/121.84
7,020,539 B1 * 3/2006 Kovacevic ............. B33Y 10/00
700/166
(Continued)

FOREIGN PATENT DOCUMENTS

CN 102218616 A 10/2011
CN 104384936 A 3/2015
(Continued)

OTHER PUBLICATIONS

Office Action dated Mar. 26, 2020 for corresponding CN App. Ser. No. 201780035811.7.
(Continued)

*Primary Examiner* — William J Levicky
*Assistant Examiner* — Adam M Eckardt
(74) *Attorney, Agent, or Firm* — Henricks Slavin LLP

(57) ABSTRACT

The invention provides a machine tool (100) having a work table (105) for mounting at least one workpiece (105A), a laser head (101) having a powder nozzle (106) for applying a material to the workpiece and for welding the material to the workpiece (105A), a laser head positioning device for positioning the laser head with respect to the workpiece in order to machine the workpiece (105A) by application and welding of the applied material, an inert gas device (108), fillable with inert gas, for machining the workpiece (105A) by way of the laser head (101) under an inert gas atmosphere, and a positioning device for moving and positioning the inert gas device (108) on the work table (105), said machine tool (100) allowing flexible machining in the scope of subtractive and additive steps of machining a workpiece on a machine tool.

13 Claims, 6 Drawing Sheets

(51) Int. Cl.
| | |
|---|---|
| *B33Y 30/00* | (2015.01) |
| *B23K 26/144* | (2014.01) |
| *B23K 26/00* | (2014.01) |
| *B23K 26/08* | (2014.01) |
| *B23K 26/12* | (2014.01) |
| *B23K 37/04* | (2006.01) |
| *H05B 6/10* | (2006.01) |

(52) U.S. Cl.
CPC .......... *B23K 26/127* (2013.01); *B23K 26/144* (2015.10); *B23K 37/0461* (2013.01); *B33Y 10/00* (2014.12); *B33Y 30/00* (2014.12); *H05B 6/10* (2013.01)

(58) Field of Classification Search
CPC .... B23K 37/0461; B23K 26/00; B23K 26/08; B23K 26/12; B23K 37/04; B33Y 10/00; B33Y 30/00; H05B 6/10; B23B 39/003; C10M 133/54; C10M 145/14; C10M 161/00; C10M 169/041; C10M 169/044; C10M 2203/003; C10M 2203/1006; C10M 2209/084; C10M 2215/04; C10M 2215/26; C10M 169/04; C10N 2030/06; C10N 2030/08; C10N 2030/12; C10N 2030/30; C10N 2030/52; C10N 2040/25; C10N 2040/252; C10N 2050/04; Y10S 901/00

See application file for complete search history.

(56) References Cited

U.S. PATENT DOCUMENTS

| | | | | |
|---|---|---|---|---|
| 2004/0104203 A1* | 6/2004 | Yamaguchi | ............ | B23K 26/12 |
| | | | | 219/121.36 |
| 2005/0220550 A1* | 10/2005 | Beier | ............ | B23B 51/101 |
| | | | | 408/153 |
| 2006/0006157 A1* | 1/2006 | Oldani | ............ | B23K 37/0235 |
| | | | | 219/121.64 |
| 2011/0244651 A1* | 10/2011 | Zakel | ............ | H01L 23/10 |
| | | | | 438/455 |
| 2015/0114938 A1 | 4/2015 | Mottin | | |
| 2016/0129528 A1* | 5/2016 | Hyatt | ............ | B29C 64/153 |
| | | | | 219/76.12 |
| 2016/0237521 A1* | 8/2016 | Zhang | ............ | C21D 10/005 |
| 2018/0085860 A1* | 3/2018 | Krajca | ............ | B25J 19/0075 |

FOREIGN PATENT DOCUMENTS

| | | | | |
|---|---|---|---|---|
| DE | 112013004531 T5 | 5/2015 | | |
| DE | 102013224649 A1 | 6/2015 | | |
| EP | 1285719 A1 | 2/2003 | | |
| EP | 3112056 A4 * | 4/2017 | ............ | B29C 64/153 |
| JP | 2015-196164 A | 11/2015 | | |
| JP | 2015-196856 A | 11/2015 | | |
| JP | 2016030285 A | 3/2016 | | |
| KR | 10-1438782 | 9/2014 | | |
| TW | 201603916 A | 2/2016 | | |
| WO | WO 95/06540 A | 3/1995 | | |
| WO | WO 01/87528 A2 | 11/2001 | | |
| WO | WO-0187528 A2 * | 11/2001 | ............ | B23K 26/32 |
| WO | WO-0187528 A2 * | 11/2007 | ............ | B23K 26/32 |
| WO | WO 2010/026397 A1 | 3/2010 | | |
| WO | WO 2015/127271 | 8/2015 | | |
| WO | WO-2015151840 A1 * | 10/2015 | ............ | B29C 64/153 |

OTHER PUBLICATIONS

International Search Report dated Oct. 2, 2017 for PCT App. Ser. No. PCT/EP2017/063817.
Office Action dated Jan. 28, 2021 for corresponding KR App. Ser. No. 10-2019-7000270.
Office Action dated Feb. 3, 2021 for corresponding JP App. Ser. No. 2018-563847.
Office Action dated Jul. 27, 2021 for corresponding CN App. Ser. No. 201780035811.7, with English language summary.

* cited by examiner

MACHINE TOOL FOR BUILD-UP WELDING

The present invention relates to a machine tool arranged to process a workpiece with a laser head for build-up welding.

BACKGROUND TO THE INVENTION

The so-called laser build-up welding is a special form of additive manufacturing in which the shaping is created by adding a material in which a surface of a workpiece is processed by applying and fusing a secondary material (e.g. metal powder, wire) by means of a laser beam. This is in contrast to the subtractive processing which is otherwise conventional in connection with machine tools and in which the shaping is usually carried out by chip-removing processes or the like.

The secondary material is applied in layers or selectively to the base material and fused with the latter. A particular advantage of this processing method is that the connection between base material and secondary material can be carried out without generating pores or cracks, as both base material and secondary material are melted and the melts bond with each other. In this way, the secondary material forms a high-strength welded connection with the surface of the workpiece during laser build-up welding.

By means of workpiece processing using laser build-up welding, it is thus possible to form three-dimensional structures with variable wall thicknesses without support geometry on the workpiece and in high quality by repeating a layer-wise or selective application of the secondary material on the workpiece. After the method step of laser build-up welding, the workpiece is usually cooled in a separate work process and fed to a metal-cutting process.

A basic patent application on the subject of additive manufacturing is DE 102013224649A1 filed by the applicant. This document discloses the concept of a machine tool that allows a precise production of workpieces by means of laser build-up welding and discusses in particular the problem of tolerances of the dimensional accuracies due to inaccuracies during the build-up welding operation and the problem of dimensional changes due to temperature variations.

Furthermore, the machining steps of subtractive workpiece machining (e.g. material removal by machining operations) are shown by IOC-controlled (intelligent orientation control) processes. A characteristic feature of such IOC-controlled processes is an increase in the complexity of the machine kinematics of machine tools that are set up for both additive and subtractive processing.

In particular, machine tools with simultaneous machining and laser processing have to meet challenges with regard to the tool change between machining and laser processing tools. In this context, it is particularly important that during build-up welding, oxidation during the layer build-up process must be suppressed by supplying a stream of shielding gas to the welding position.

Accordingly, the prior art discloses systems for laser welding or laser sintering, in which a controllable working atmosphere can be generated in a processing section. For example, patent specification WO 2010/026397 A1 describes a device for additive manufacturing (laser sintering, laser welding) with a processing chamber and a replaceable optical module with a hermetically sealable housing in order to guide a laser beam through a window of the process chamber. In addition, the module can be configured to generate an inert gas atmosphere to maintain the components within the optical module at a constant temperature.

Patent specification U.S. Pat. No. 7,020,539 B1 describes a thermal coating system (e.g. welding based coating system, laser based coating system) for the application of material layers by means of metal powder to be welded in order to produce three-dimensional components. The thermal coating system can comprise a chamber of a powder feed system configured to create a vacuum in the chamber by means of an inert carrier gas flow through an inlet and outlet opening in order to remove contaminants from a surface of a powder distributing device in the chamber.

One object of the present invention is to provide, with regard to the prior art, a machine tool and a method which allow an optimization of the process sequences in additive workpiece processing, in particular to increase the efficiency in workpiece processing and the quality of the processed workpieces.

For this purpose, the invention proposes a machine tool according to claim 1 and a method according to claim 13. Dependent claims relate to preferred embodiments of the invention.

According to the invention, a machine tool is proposed which comprises a work table for clamping at least one workpiece, a laser head with a powder nozzle for applying a material to the workpiece and welding the material to the workpiece, a laser head positioning device for positioning the laser head relative to the workpiece for processing the workpiece by applying and welding the applied material, a shielding gas device which can be filled with a shielding gas for processing the workpiece by the laser head under a shielding gas atmosphere, and a positioning device for moving and positioning the shielding gas device on the work table.

By designing the machine tool according to the invention with a shielding gas device, which can be moved and positioned by means of the positioning device, there are a number of significant advantages with regard to the process sequence for laser build-up welding or additive manufacturing.

The entire workpiece can be positioned in a shielding gas atmosphere so as to further improve the protection against oxidation which can occur as a result of workpiece heating by the laser during build-up welding.

In particular, oxidation can also be prevented at the sections of the workpiece that are not directly covered by the shielding gas exiting the powder nozzle of the laser head.

A further essential advantage of the movable shielding gas device is that, in comparison to stationary shielding gas chambers installed on the machine tool, a non-stationary shielding gas device can be easily replaced so that, for example, the size of the shielding gas device can be adapted to the workpiece in question and thus the shielding gas consumption can be metered with regard to the workpiece volume.

A further significant advantage results from the fact that the positioning device for moving and positioning the shielding gas device makes the machine tool particularly suitable for conventional metal processing, such as drilling, turning and milling, since the tool configuration on the work table can be easily converted by lifting the shielding gas device—which is, in principle, not required for machining—from the work table and moving it.

A particularly advantageously designed embodiment of the machine tool according to the invention has a shielding gas device which includes an induction coil for heating the workpiece. In particular, the induction coil can be arranged in the shielding gas device in such a way that, when the shielding gas device is placed on the work table by the positioning device, the workpiece is circumferentially surrounded by the induction coil.

In this way, it is possible to preheat the workpiece specifically. The simultaneous charging of the working area formed by the shielding gas device with shielding gas reliably prevents oxidation of the entire surface of the workpiece.

The preheating of the workpiece prior to laser processing already has significant advantages. On the one hand, the period necessary to achieve the required welding temperatures on the workpiece is reduced by the laser. On the other hand, the workpiece is prevented from exhibiting a high temperature gradient over the entire workpiece volume as a result of local laser processing, which can distort the workpiece material or even lead to material defects, such as cracking, and can have a negative influence on the dimensional accuracy in relation to the shape.

This is of decisive importance for the precision which is required today in the machine tool sector and which is often in the micrometer (μm) range in terms of workpiece geometry.

Due to the direct arrangement of the induction coil in the shielding gas device, it is possible to move this coil together with the shielding gas device. Thus, a machine tool which is simultaneously equipped for machining has additional advantages with regard to the required working times, since the duration of the laser processing can be shortened due to the preheated workpiece. In conclusion, it is found that the "mobile" shielding gas device according to the invention which has an integrated induction coil thus ensures a shortened processing time and increased processing accuracy.

In another particularly advantageous embodiment of the present invention, the laser head is equipped with a tool interface and can be introduced via this interface into a work spindle of the machine tool. According to the invention, the laser head positioning device here includes the work spindle. The tool interface is designed as a hollow shank taper (HSK) or a steep taper, for example.

The kinematics required for moving and positioning the shielding gas device by the positioning device can be realized in different ways according to the invention:

The shielding gas device can also have a standard tool interface, such as a hollow shank taper (HSK) or steep taper, by means of which the shielding gas device can be directly introduced into the work spindle of the machine tool. This has the advantage that no separate kinematics of the positioning device is required to move the shielding gas device, which in turn limits the necessary design effort and ensures optimum space conditions in the area of the work table during the processing situation.

Thus, workpiece processing is carried out according to the invention by moving the shielding gas device accommodated in the work spindle over a workpiece on the work table and positioning it on the work table. The shielding gas device is detached from the work spindle while the shielding gas device remains on the work table and surrounds the workpiece. The laser head is introduced into the tool interface of the work spindle and moved to the workpiece in the shielding gas device for laser welding.

Alternatively, the shielding gas device can also be equipped with a moving or positioning device which is different from the work spindle. Such a design has the advantage that, for example, work steps can be carried out in parallel using the work spindle at the same time as the shielding gas device is positioned on the work table. For example, the shielding gas device can be guided, for this purpose, on a slide that travels over the work table whereupon the shielding gas device is placed on the work table.

With a particularly advantageous design, the tool device according to the invention has a transport device e.g. guided on horizontal guide rails, for feeding the shielding gas device to a transfer position where it can be picked up e.g. by the work spindle using a conventional tool interface. Such a device has the essential advantage that the shielding gas device can also be moved by means of the transport device outside the working area, even outside the cabin area which limits the working area, and thus the space in the working area is not unnecessarily restricted.

In order to optimize the space conditions in the working area, the laser head can also be picked up by the transport device and fed into the working area or moved out of it and even outside the cabin area. For this purpose, for example, the shielding gas device and the laser head can be mounted together on the transport device in such a way that they can be removed.

Irrespective of whether a transport device is available, the shielding gas device and the laser head can also be combined with each other structurally, e.g. by detachably mounting the shielding gas device on the side of the laser head housing. This variant is particularly space-saving and requires fewer introduction operations into the work spindle, since laser head and shielding gas device can basically be introduced together, e.g. via a tool interface of the laser head in the work spindle. In other words, the working spindle acts in this case both as a positioning device for moving and positioning the shielding gas device within the meaning of claim 1 and as an element of the laser head positioning device for positioning the laser head in relation to the workpiece.

In this embodiment, in which the laser head and the shielding gas device are structurally combined, for feeding both functional components to the laser head positioning device by means of the transport device, and also in other embodiments, it can be useful for a positioning device according to the invention that moves and positions the shielding gas device to additionally have a gripping device with a gripping arm, by means of which the shielding gas device can be moved and positioned.

It is thus possible, for example, to feed the laser head and the detachably arranged shielding gas device together via the transport device into the region of the working area, to insert the laser head into the tool interface and then to position the shielding gas device exactly above the workpiece by means of the gripping device.

In a particularly simple embodiment of the present invention, the gripping device is simultaneously a positioning device for moving and positioning the shielding gas device and can also be moved and positioned completely independently of the mechanism for moving the laser head.

In this context, it should be noted that the term "gripping device" should in no way be construed as confining, from a design point of view, to a gripping mechanism in the strict sense. On the contrary, the term "gripping" stands for the creation of a detachable connection between the (gripping) device and the shielding gas device, irrespective of whether a gripper, a latching mechanism or another design mechanism is used to create the releasable connection.

The shielding gas device preferably has a cylindrical housing. Irrespective of the housing shape, the housing of the shielding gas device can comprise a supply line for a shielding gas and a controllable valve for filling the shielding gas device with the shielding gas.

In addition, an elastic seal can be provided on the underside of the shielding gas device to seal a contact surface between the shielding gas device positioned on the work table and the work table. In this way it can be prevented that the shielding gas, which has a higher density than air, can escape by a gap formation at the underside of the shielding gas device.

A clamping mechanism can be provided to ensure that the shielding gas device is fixed in place at the set-down position after positioning on the work table. Here, too, the term "clamping" is to be understood as a common technical term in machine tool construction and not in a structurally restrictive manner. Any apparatus is suitable which allows the shielding gas device to be fixed on the work table. This fixation can be done e.g. mechanically, pneumatically, magnetically or by vacuum.

In order to implement the present invention, the machine tool according to the invention can be equipped with a control device for specifying a machining sequence comprising the steps of:

Positioning a shielding gas device by means of a positioning device at a first position of a work table in such a way that the shielding gas device encloses a first workpiece clamped on the work table, filling the shielding gas device with shielding gas, positioning a laser head by means of a laser head positioning device in a working position in the region of the workpiece for processing the workpiece by applying and welding a material, processing the workpiece by means of the laser head under a shielding gas atmosphere, moving the laser head after machining the workpiece by the laser head positioning device, lifting the shielding gas device from the work table by means of the positioning device, positioning a shielding gas device at a position on the work table where a second workpiece is clamped, and repeating the above mentioned steps.

In this way, it is possible to process several workpieces in rapid succession one after the other by laser build-up welding without having to reposition the shielding gas device each time. In this way, it is also possible to already machine a second workpiece while the first workpiece, which has already been machined, is still cooling down. In principle, this means that the first workpiece which is already machined is "detached" for further processing steps immediately after the laser build-up welding step, so that subtractive processing can follow immediately afterwards.

The "mobile" shielding gas device, which is designed so as to be moved by means of the positioning device according to the invention, therefore allows the necessary working times to be considerably shortened, especially when combining subtractive and additive processing methods on the same machine tool, since parallel processing of different tools clamped on the work table becomes possible. At the same time, the dimensional accuracy can be considerably increased in this way, since the machine tool set up according to the invention ensures that the formation of temperature gradients as a result of laser processing is reduced by preheating the workpiece during laser build-up welding operation and that, in addition, machining can be carried out subsequently without this machining having to be carried out on the "hot" workpiece.

In this context, the invention also discloses a method for the additive and subtractive processing of a workpiece on a machine tool, said method comprising the steps of: positioning a shielding gas device by means of a positioning device at a first position of a work table in such a way that the shielding gas device encloses a first workpiece clamped on the work table, filling the shielding gas device with shielding gas, positioning a laser head by means of the laser head positioning device in a working position in the region of the workpiece for additive processing of the workpiece by laser build-up welding, additively processing the workpiece by laser build-up welding by means of the laser head in a shielding gas atmosphere, moving the laser head after processing the workpiece by the laser head positioning device, lifting the shielding gas device from the work table by means of the positioning device, and subtractively machining the workpiece e.g. by drilling, turning or milling before or after the complete cooling of the workpiece.

The process can also include the steps of positioning the shielding gas device at a second position on the work table where a second workpiece is clamped, and repeating said laser build-up processing steps.

With the method according to the invention, the machining of the first workpiece can take place in immediate sequence to the processing of a second workpiece by laser build-up welding.

Said processing or method steps are, of course, not limited to two workpieces. On the contrary, several workpieces simultaneously clamped on the work table or workpieces clamped one after the other on the work table can be machined in this sequence.

In the following, examples of the present invention are described with reference to the drawings. Equal or similar elements in the drawings can be designated with the same reference signs.

Figure 1:
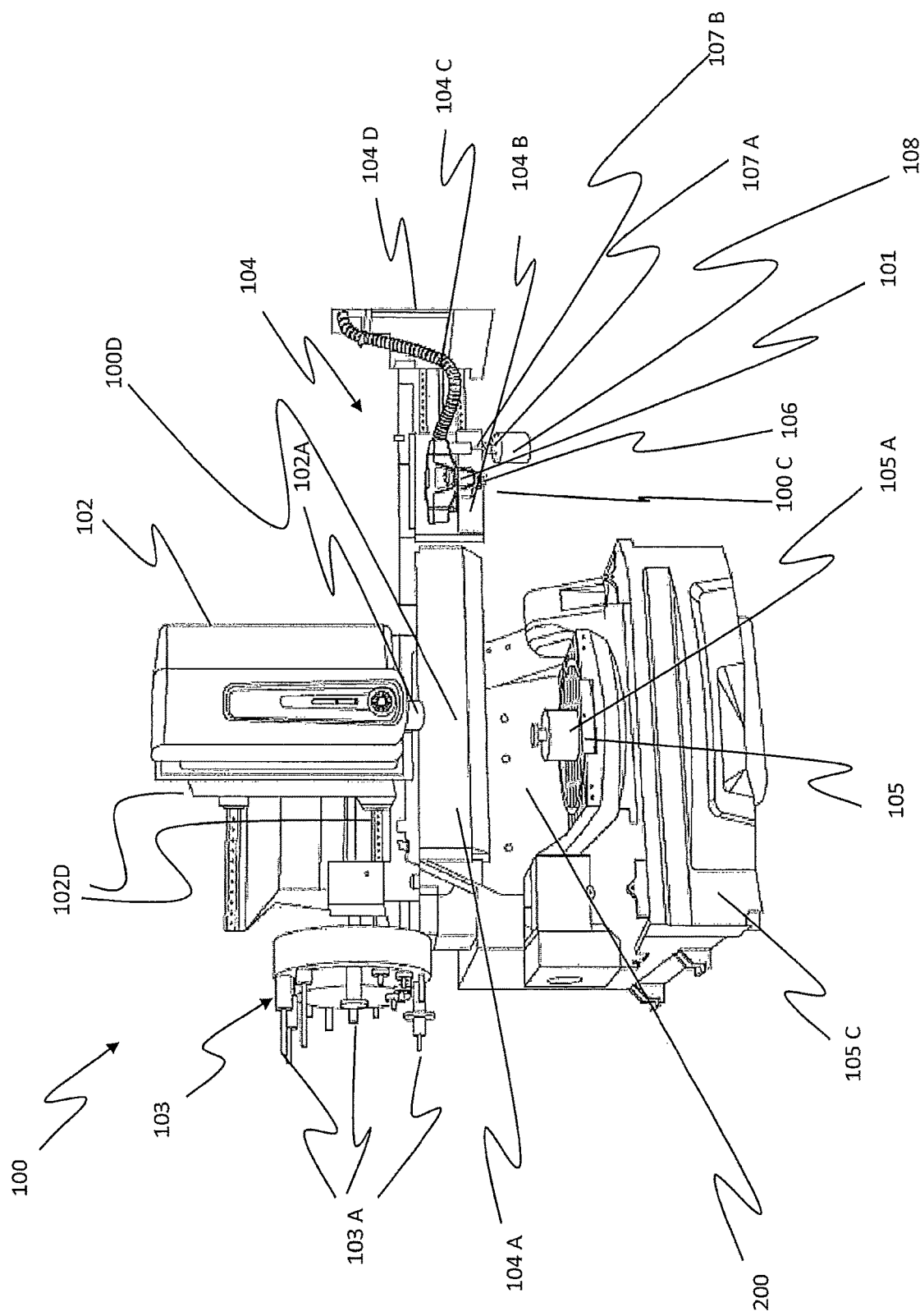
FIG. 1 shows a schematic perspective view of a machine tool according to a first embodiment of the invention.

FIG. 1 shows a schematic perspective view of a machine tool 100 with a movable laser head 101, a support device 102, which is designed as a work spindle with hollow shaft cone interface (HSK) to pick up and position the laser head or subtractive machining tools 103A according to an embodiment of the invention. The subtractive machining tools 103A are conveniently stored in a tool magazine 103 of the machine tool 100. Furthermore, a work table 105 for providing at least one 105A workpiece for processing is available. The work table is rotatably mounted on a machine bed 105C of the machine tool 100.

The laser head 101 of this embodiment can be moved by means of a transport device 104 from any first random position 100C to a second position 100D in such a way that it can be picked up by the work spindle 102. For this purpose, the laser head 101 is arranged on a moving section (slide) 104B and is moved along a horizontal guide rail 104A from the first to the second position. The laser head is also fitted with a flexible feed line 104C for introducing the welding material into the powder nozzle 106 of the laser head. The feed line 104C follows when the laser head 101 is moved. The work spindle 102 is mounted on two horizontal guides 102D. Alternatively, the work spindle 102 can be equipped with tools 103A from the tool magazine 103 of the machine tool, e.g. to carry out milling machining steps on a workpiece 105A.

Figure 2:
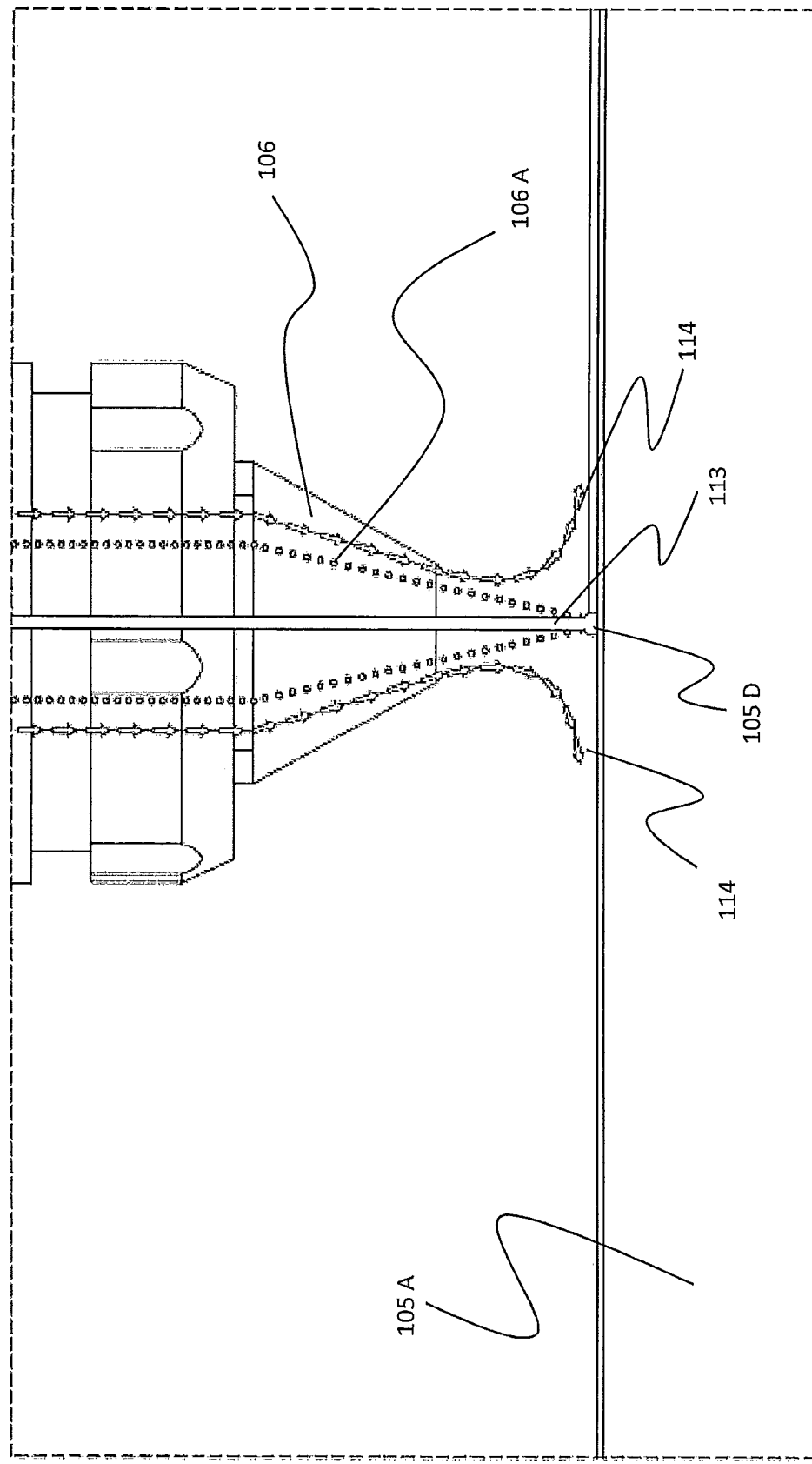
FIG. 2 shows a schematic diagram of the functional principle of laser build-up welding according to an embodiment of the invention.

FIG. 2 shows the functional principle of laser build-up welding in a machine tool according to the invention. From the powder nozzle 106, the laser beam 113 is directed to a welding position 105D on the surface of the workpiece 105A to be processed and welds powder 106A deposited in layers to the workpiece 105A. During the welding operation, a shielding gas 114 is ejected from the nozzle outlet, thus preventing oxidation around the weld.

Figure 3:
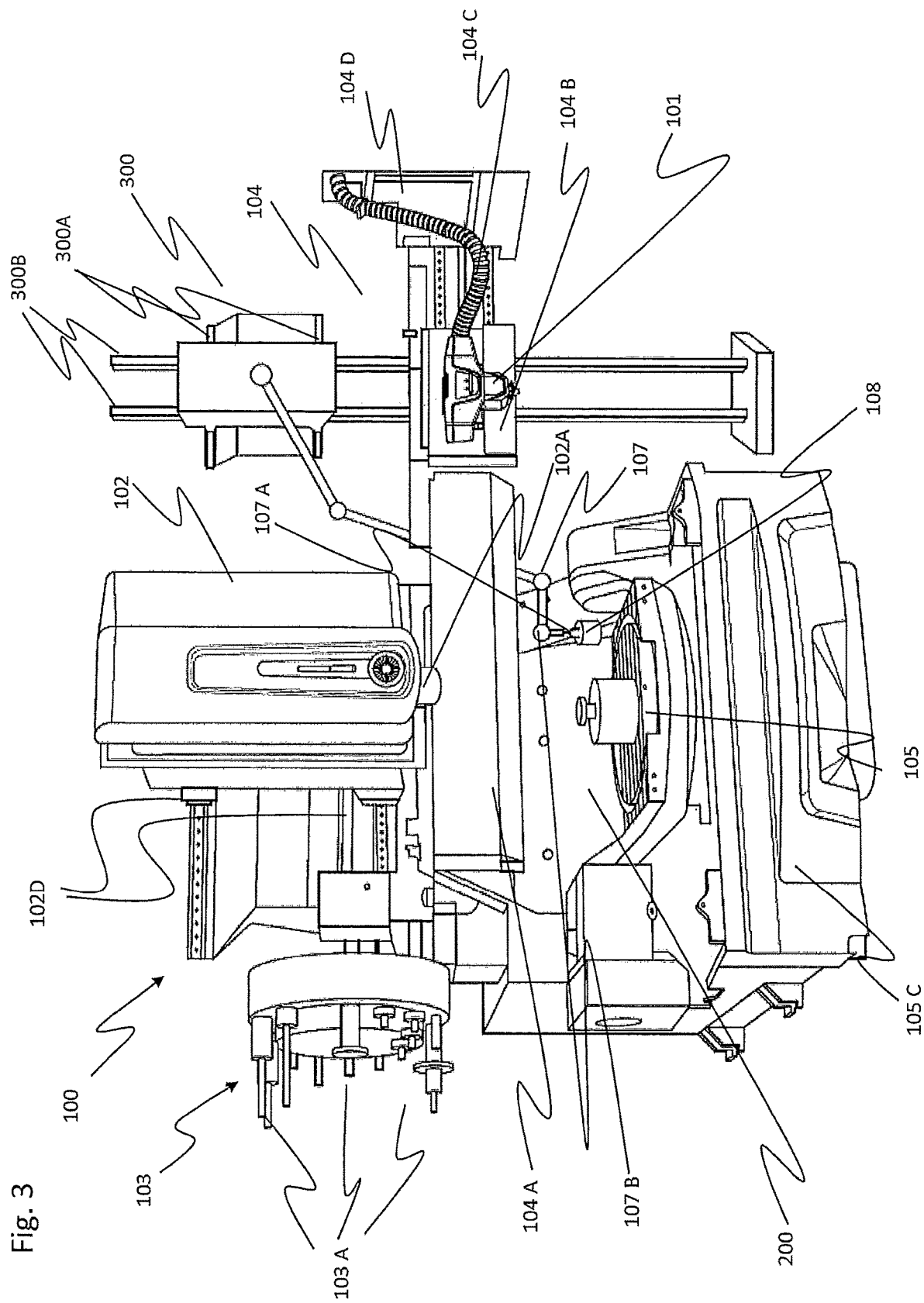
FIG. 3 shows an alternative second embodiment of the machine tool according to the invention, in which the shielding gas device is positioned with a separate transport device.

FIG. 3 shows an alternative design of the machine tool 100 according to the invention. In this inventive embodiment of the transport device 300 for moving the shielding gas device, the shielding gas device 108 is detachably mounted on a gripping device 107 with a gripping arm 107B and a gripper 107A, the gripping arm and the gripping device being connected to the transport device 300. The gripping device can also be moved via horizontal guides 300A and vertical guides 300B of the transport device 300 relative to the work table 105 of the machine tool 100 and the workpiece. Thus, the laser head 101 and the shielding gas device 108 can be controlled and moved independently of each other. In this embodiment, the transport device is equipped with a separate control unit which is integrated in the transport device 300.

Figure 4:
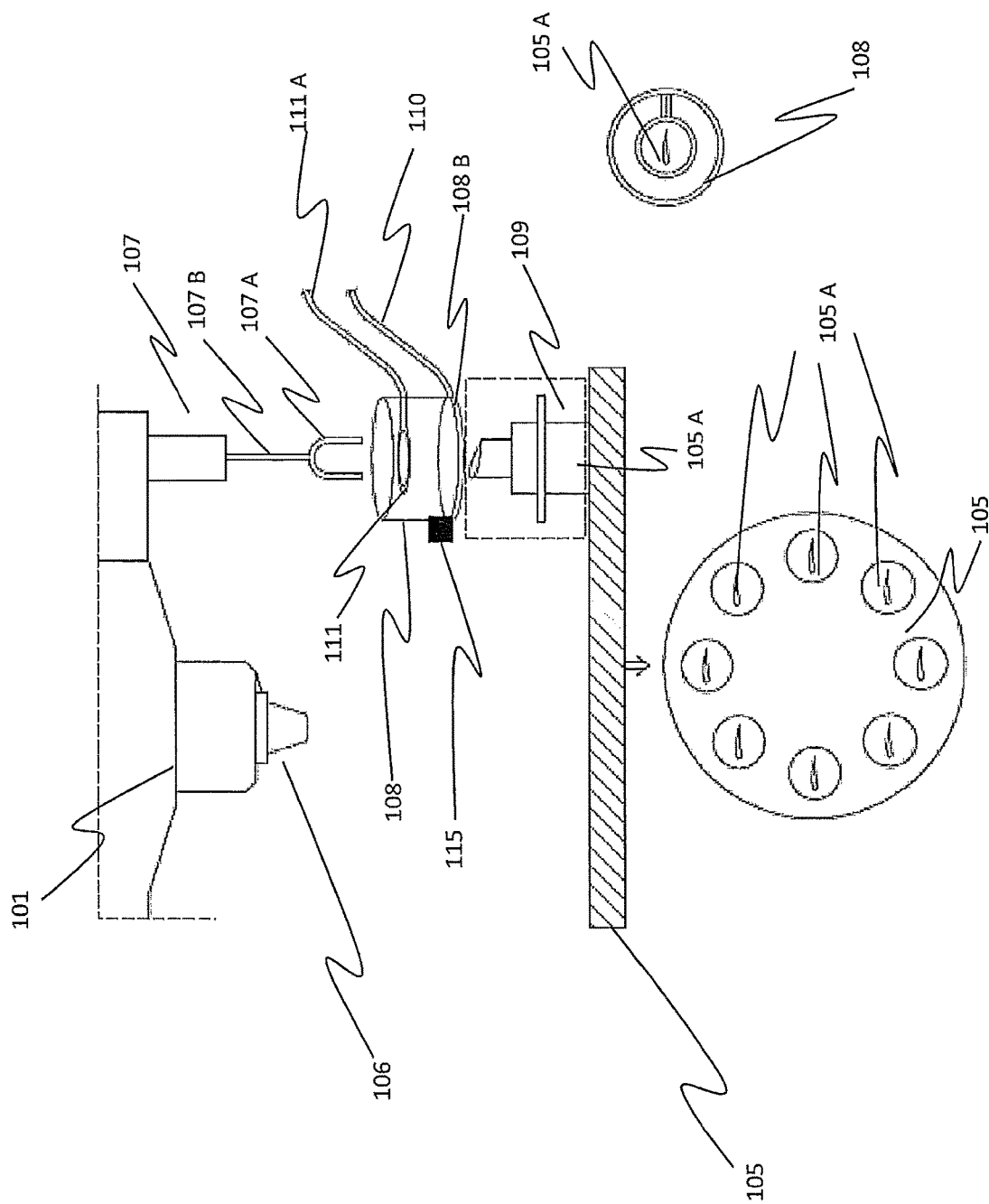
FIG. 4 shows a schematic diagram of a section of a machine tool according to the invention.

FIG. 4 shows a schematic diagram of the laser head 101 with powder nozzle 106 and a gripping device 107 with gripping arm 107B and the gripper 107A for picking up, positioning and setting down a shielding gas device 108 over a workpiece 105A, which is clamped on the work table 105. The gripping device 107 is arranged on the laser head 101. This means that the work spindle can also be used to position the gripping device quickly and accurately.

A plurality of workpieces 105A can be clamped on the work table 105. FIG. 4 also shows details of the shielding gas device 108, which is moved over the workpiece to be processed and lowered to provide around the workpiece 105A a work space 109, in which a shielding gas atmosphere is created by the shielding gas supply 110. The seal 108B on the underside of the shielding gas device 108 prevents the escape of shielding gas. Furthermore, a clamping mechanism 115 between the seal 108B and the surface of the work table 105 ensures that the shielding gas device is fixed on the work table 105.

An induction coil 111, which is arranged inside the shielding gas device, has a power supply 111A and surrounds the workpiece 105A in ring-shaped fashion when the shielding gas device 108 is set down over the workpiece 105A, allows uniform heating of the workpiece 105A. Thus, temperature gradients on the workpiece can be reduced and damage during the welding process caused by distortion of the unevenly heated workpiece can be avoided. In addition, the welding process can be carried out more quickly by preheating the material.

The shielding gas atmosphere generated around the workpiece 105A provides additional oxidation protection along with the shielding gas layer at the welding position that can be generated by the powder nozzle by means of shielding gas flow. This prevents oxidation processes on the workpiece at other locations on the workpiece surface that do not correspond to the laser welding position.

Figure 5:
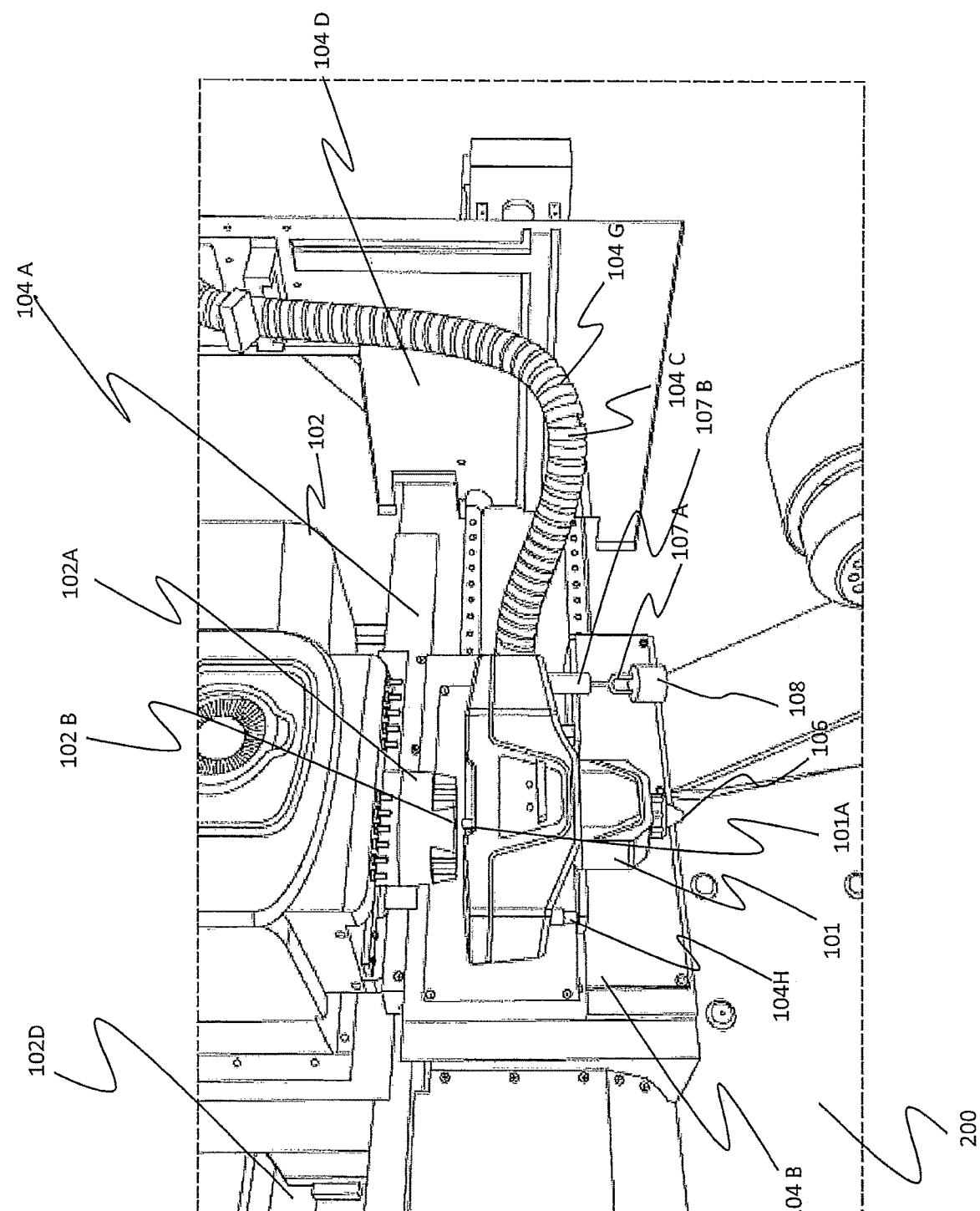
FIG. 5 shows a schematic perspective view of the support of the laser head into a work spindle according to the first embodiment of the invention.
Figure 6:
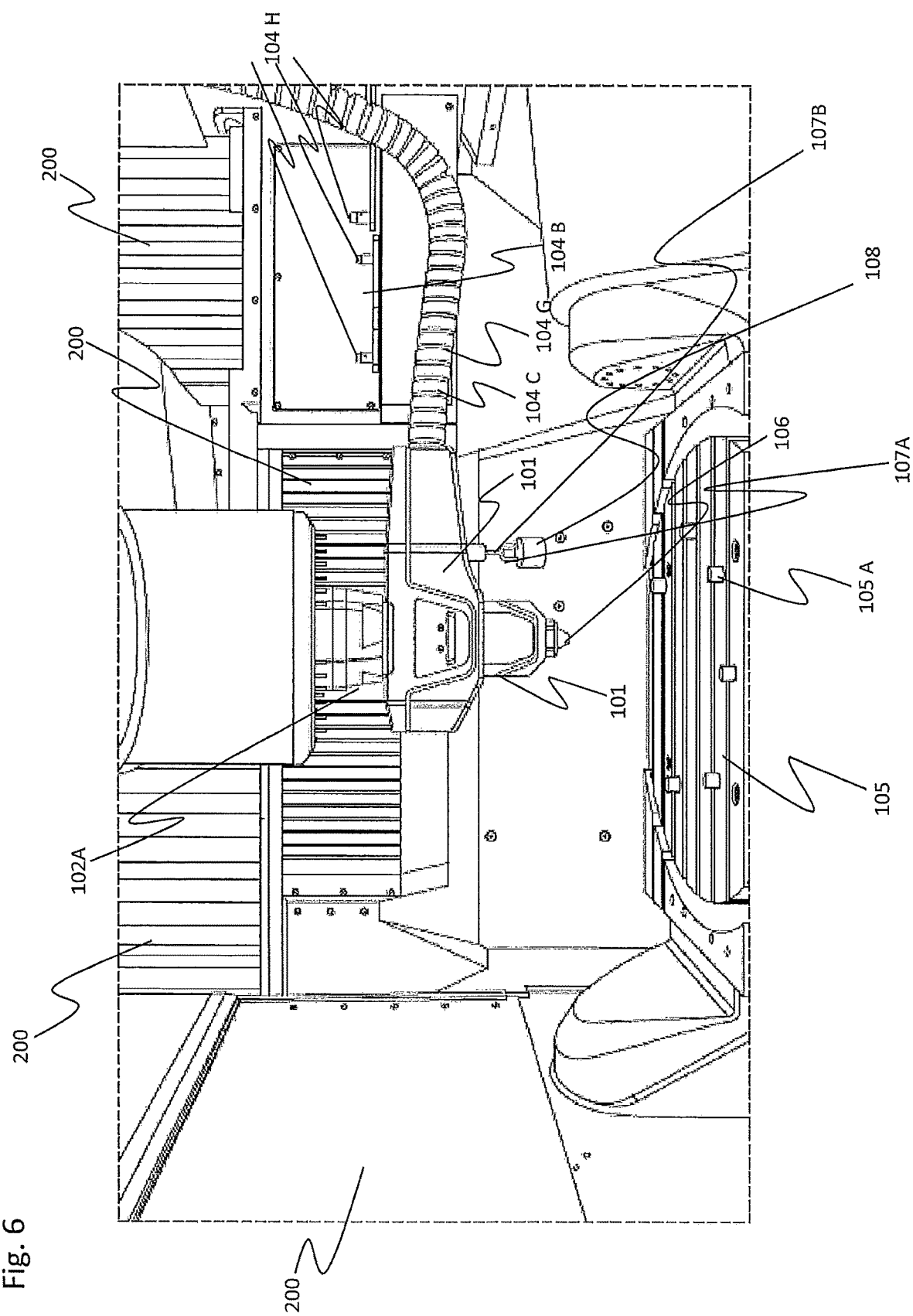
FIG. 6 shows a schematic perspective view of the accommodated laser head in the work spindle according to an embodiment of the invention.

FIG. 5 and FIG. 6 show the support of the laser head 101 with the powder nozzle 106 in the spindle head 102A of the work spindle 102. The laser head 101 is held on the slide 104B by means of support pins 104H, which engage in openings (not visible) on the laser head 101. The laser head 101 is moved to the spindle head 102A by means of the guide rail 104A and inserted into the spindle head 102A. The spindle pin 101A of the laser head 101 is here introduced into the spindle head opening 102B. The laser head 101 is connected to a powder reservoir (not shown) by means of a supply line 104C that can follow up in order to supply the powder nozzle 106 with material for build-up welding. The supply line 104C comprises flexible ring segments 104G spaced from one another. After coupling the laser head 101 with the spindle head 102A, a protective plate 104D is joined flush with the slide 104B to protect the welding area. This, together with walls 200, provides a spatially separated work area within the cabin. In the state coupled with the work spindle, the laser head 101 is movable for the five-axis machining of a workpiece 105A on the work table 105. The spindle head 102A can position the laser head 101 in any position relative to a workpiece 105A located on the work table 105. According to the illustrated embodiment of the invention, the work spindle 102, the work spindle head 102A and the horizontal guide 102D form the elements of the laser head positioning device according to the invention. The shielding gas device 108 is arranged on the laser head 101. Laser welding is carried out in the working cabin, which is enclosed by the walls 200 and the protective plate 104D, thus separating the working area from the outside environment.

FIGS. 1-6 show a machine tool according to the invention or the elements thereof, which thus allows a plurality of workpieces 105A, which are clamped on the work table 105, to be processed additively and subtractively in a short sequence. For this purpose, the shielding gas device 108 is positioned above the workpiece to be processed by means of the gripping device and set down. The laser head 101 attached to the spindle head is moved to the position of the shielding gas device 108 and moved by means of the spindle head 102A into the working space 109 of the shielding gas device. A shielding gas atmosphere is generated around the workpiece 105A by introducing a shielding gas via the supply line 110 into the shielding gas device 108. The workpiece is heated by the induction coil 111 of the shielding gas device 108, which encompasses the workpiece, and additive processing (laser build-up welding) of the workpiece 105A is carried out on the workpiece. After laser processing, the laser head 101 is moved out of the shielding gas device, the shielding gas device 108 is lifted from the workpiece 105A by means of the gripping device 107 and moved to the position of a second workpiece clamped on the work table 105 and set down above it, and the first workpiece 105A is subjected to subtractive machining, e.g. by drilling, turning or milling, before or after the first workpiece 105A has completely cooled down.

The above described work process is now repeated with a number or all workpieces 105A clamped on the work table 105. After completion of the additive processing by laser build-up welding, the processed and cooled workpieces 105A can be subjected to a subtractive processing method. For this purpose, the laser head is placed on the laser head support pin 104H of the slide 104B, detached from the work spindle 102 and moved by means of the guide rail 104A to a storage position 100C of the laser head 101. Then, a tool head 103A from the tool magazine 103 of the machine tool is supplied to the work spindle, and the tool head 103A is moved to the position of the workpiece 105A, e.g. to perform a milling operation on the workpiece 105A.

The present invention is not limited to the embodiments described and the features thereof but also includes modifications of the embodiments, which are covered by a combination of features of the described examples within the scope of protection of the independent claims, insofar as they are within the scope of know-how of a person of ordinary skill in the art.

The invention claimed is:

1. A machine tool (100) comprising:
    a work table (105) configured to clamp at least one workpiece (105A),
    a laser head (101), having a powder nozzle (106), configured to process the workpiece (105A) by applying a material to the workpiece and welding the applied material to the workpiece (105A),
    a laser head positioning device configured to position the laser head (101) with respect to the workpiece (105A),
    a shielding gas device (108) configured to be positioned on the work table (105) around the workpiece (105A) and, when on the work table (105), to provide a work space (109) around the workpiece (105A) that is filled with a shielding gas during processing of the workpiece (105A) by the laser head (101) such that the workpiece (105A) is processed under a shielding gas atmosphere, and
    a positioning device configured to move the shielding gas device (108) in at least two directions, to position the shielding gas device (108) above the workpiece (105A) on the work table (105), to lower the shielding gas device (108) onto the work table (105) and over the workpiece (105A), and to detach from the shielding gas device (108) while the shielding gas device (108) is on work table (105), wherein
    the laser head positioning device is configured to move the laser head (101) into the shielding gas device (108) on the work table (105).

2. The machine tool (100) according to claim 1, characterized in that the shielding gas device (108) comprises an induction coil (111) for heating the workpiece (105A).

3. The machine tool (100) according to claim 2, characterized in that the induction coil (111) is arranged in the shielding gas device (108) in such a way that when the shielding gas device (108) is placed on the work table (105) by the positioning device, the workpiece (105A) is surrounded circumferentially by the induction coil (111).

4. The machine tool (100) according to claim 1, characterized in that the laser head (101) is provided with a tool interface and is configured to be introduced into a work spindle of the machine tool (100) via this interface.

5. The machine tool (100) according to claim 1, characterized in that the shielding gas device (108) is provided with a tool interface and is configured to be introduced into a work spindle (102) by way of the tool interface.

6. The machine tool (100) according to claim 1, characterized in that the positioning device for moving and positioning the shielding gas device is designed as a gripping device (107) with a gripping arm (107a), configured to pick up, move and position the shielding gas device (108).

7. The machine tool (100) according to claim 6, characterized in that the gripping device (107) is arranged on the housing of the laser head (101).

8. The machine tool (100) according to claim 1, characterized in that the housing of the shielding gas device (108) comprises a supply line (110) for a shielding gas and a controllable gas valve for filling the shielding gas device with shielding gas.

9. The machine tool (100) according to claim 1, characterized in that an elastic seal (108B) is provided on the underside of the shielding gas device (108) configured to seal a contact surface between the shielding gas device (108) positioned on the work table (105) and the work table (105).

10. The machine tool (100) according to claim 1, characterized in that the shielding gas device (108) comprises a clamping mechanism (115) configured to clamp the shielding gas device (108) in stationary fashion on the work table (105).

11. The machine tool (100) according to claim 1, characterized by a control device for presetting a processing sequence, comprising the steps of
    positioning the shielding gas device (108) with the positioning device at a first position of the work table (105) in such a way that the shielding gas device (108) encloses a first workpiece (105A) clamped on the work table,
    filling the shielding gas device (108) with shielding gas,
    positioning the laser head (101) with the laser head positioning device into a working position in the area of the workpiece (105A) for processing,
    processing the workpiece (105A) with the laser head (101) in a shielding gas atmosphere,
    moving the laser head (101) after the workpiece processing by the laser head positioning device,
    lifting the shielding gas device (108) from the work table with the positioning device (107) and, if a second workpiece (105A) is on the work table (105),
    positioning the shielding gas device (108) at a second position on the work table (105) where the second workpiece (105A) is clamped, and
    repeating the above mentioned steps.

12. A method of additive and subtractive processing with a machine tool (100), comprising the steps of:
    positioning a shielding gas device (108) with a positioning device, that is configured to move the shielding gas device (108) in at least two directions and from which the shielding gas device (108) is detachable, on a work table (105) at a first position of the work table (105) and over a first workpiece (105A) clamped on the work table (105) at the first position in such a way that the shielding gas device (108) provides a work space (109) around the first workpiece (105A),
    detaching the shielding gas device (108) from the positioning device while the shielding gas device (108) remains on the work table (105),
    filling the work space (109) of the detached shielding gas device (108) on the work table (105) with shielding gas,
    positioning a laser head (101) with a laser head positioning device in a working position within the detached shielding gas device (108) on the work table (105) in the region of the workpiece (105A),
    additively processing the workpiece (105A) by laser build-up welding with the laser head (101) under a shielding gas atmosphere within the detached shielding gas device (108) on the work table (105),
    moving the laser head (101) after the workpiece processing with the laser head positioning device,
    reattaching the detached shielding gas device (108) on the work table (105) to the positioning device,
    lifting the reattached shielding gas device (108) from the work table (105) with the positioning device,
    positioning the shielding gas device (108) on the work table (105) at a second position of the work table (105) and over a second workpiece (105a) clamped on the work table (105) at the second position in such a way that the shielding gas device (108) provides a work space (109) around the second workpiece (105A), and subtractively machining the workpiece (105A), e.g. by drilling, turning or milling, with a tool on the laser head positioning device before or after the complete cooling of the workpiece (105A) while the shielding gas device (108) is being positioned on the work table (105) at the second position of the work table (105).

13. The method for the additive and subtractive processing of a workpiece (105A) on a machine tool (100) according to claim 12, further comprising the steps of:

filling the work space (109) of the shielding gas device (108) at the second position with shielding gas, positioning the laser head (101) with the laser head positioning device in a second working position in the region of the second workpiece (105A) within the shielding gas device (108) at the second position, additively processing the second workpiece (105A) by laser build-up welding with the laser head (101) under a shielding gas atmosphere within the shielding gas device (108) at the second position, moving the laser head (101) after the second workpiece processing with the laser head positioning device, lifting the shielding gas device (108) at the second position from the work table (105) with the positioning device, and subtractively machining the second workpiece (105A), e.g. by drilling, turning or milling, before or after the complete cooling of the second workpiece (105A).

* * * * *